(12) United States Patent
McLean et al.

(10) Patent No.: US 7,877,974 B2
(45) Date of Patent: Feb. 1, 2011

(54) FLOATING SWATHGATE

(75) Inventors: Kenneth W. McLean, New Holland, PA (US); Robert L. Rice, New Holland, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/141,294

(22) Filed: Jun. 18, 2008

(65) Prior Publication Data
US 2009/0313964 A1    Dec. 24, 2009

(51) Int. Cl.
*A01D 43/00* (2006.01)
(52) U.S. Cl. .......................................... 56/189; 56/192
(58) Field of Classification Search ................. 56/17.4, 56/189, 190, 364, 192
See application file for complete search history.

(56) References Cited

U.S. PATENT DOCUMENTS

| | | | |
|---|---|---|---|
| 1,944,829 A | 1/1934 | Self | |
| 2,064,480 A | 12/1936 | Lock et al. | |
| 2,270,208 A * | 1/1942 | Lindgren et al. | 56/190 |
| 2,524,233 A * | 10/1950 | Russell | 56/364 |
| 3,092,946 A | 6/1963 | Mathews | |
| 3,109,273 A * | 11/1963 | Soldner | 56/190 |
| 3,241,300 A | 3/1966 | Fell et al. | |
| 3,543,491 A | 12/1970 | Lausch | |
| 3,721,073 A | 3/1973 | Scarnato et al. | |
| 3,747,313 A * | 7/1973 | Denzin | 56/364 |
| 3,881,303 A | 5/1975 | Krafka et al. | |
| 4,099,364 A | 7/1978 | Kanengieter et al. | |
| 4,217,746 A | 8/1980 | Cicci et al. | |
| 4,251,980 A | 2/1981 | Miller | |
| 4,304,090 A * | 12/1981 | Gavrilenko et al. | 56/364 |
| 4,768,333 A | 9/1988 | Reber | |
| 4,858,419 A | 8/1989 | Bernier | |
| 5,930,988 A | 8/1999 | Hanson | |
| 6,775,968 B2 | 8/2004 | Carlot et al. | |
| 6,854,251 B2 * | 2/2005 | Snider | 56/192 |
| 7,107,748 B2 * | 9/2006 | McClure | 56/190 |

* cited by examiner

*Primary Examiner*—Alicia M Torres
(74) *Attorney, Agent, or Firm*—Patrick M. Sheldrake; Michael G. Harms

(57) ABSTRACT

A floating swathgate for a cutting and conditioning header for a frame-supported tractor in which the angular attitude of the swathgate relative to an airborne stream of crop material being ejected from conditioner apparatus is varied as the header moves vertically with respect to the tractor to optimally direct the crop material toward a rearwardly disposed crop merger conveyor. As the header moves vertically, changes in the angular attitude of the swathgate direct the airborne crop material to generally the same location on the merger conveyor to minimize crop losses that typically occur with a fixed swathgate when the crop trajectory varies directly with the header vertical movement.

17 Claims, 5 Drawing Sheets

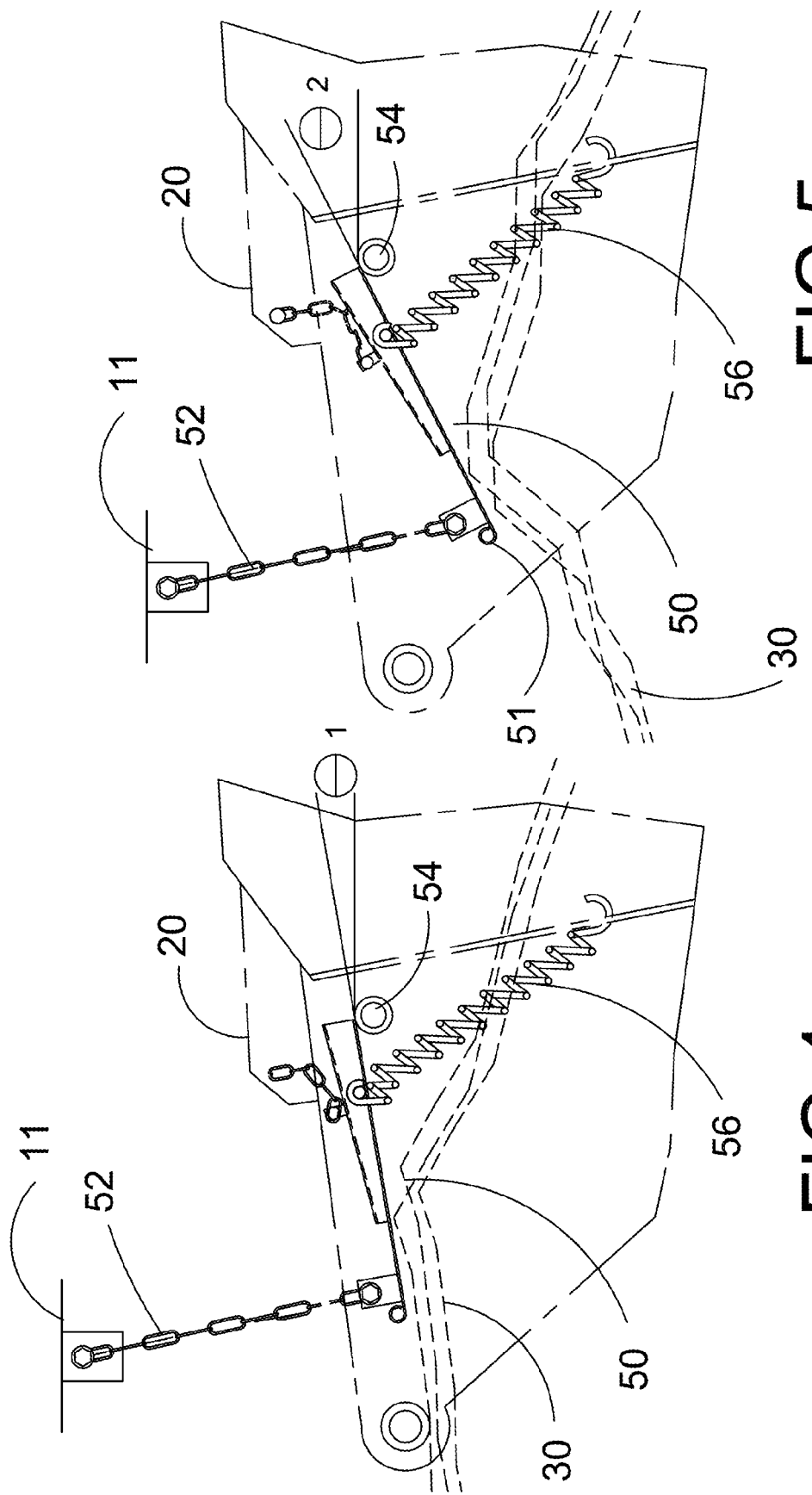

FLOATING SWATHGATE

BACKGROUND OF THE INVENTION

This invention relates generally to harvesting machines, such as windrowers or mower-conditioners, of the type having a header with a pair of counter-rotating conditioning rolls to deliver crop material in a rearwardly directed stream for ultimate deposit on the ground in windrow, and, more particularly, to a floating swathgate for optimally directing crop responsive to upward or downward movement of the header.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms in a manner that allows the header to float across the ground surface independent of the motion of the tractor. Current practice in agriculture is to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations, such as baling.

It is highly desirable to combine multiple windrows together as they are being mowed. This practice eliminates a raking operation and also reduces the number of passes of subsequent harvesting operations (e.g., chopping and baling). With the advent of higher capacity forage harvesters and balers, merging windrows is becoming a more desirable practice. Windrow merging attachments are thus more prevalent on harvesting machines. Windrow mergers are generally connected to the tractor chassis and held in a fixed position in the flow of crop being ejected by the header. A movable conveyor on the merger apparatus intercepts the ejected crop prior to it reaching the ground and conveys to a ground location laterally displaced from the windrower centerline.

Proper positioning of the merger apparatus is essential to intercept the majority of the crop material and minimize wastage. However, as the merger apparatus is typically held stationary with respect to the chassis while the header is allowed to move relative to the chassis, some crop material may be directed away from the merger conveyor as the harvester moves across the ground. Movable side shields and swathgates are often employed to deflect the crop material ejected from the conditioner rolls to a desired location, but these are often statically positioned and are not dynamically repositioned in response to header movement. As a result, the crop flow may not be ideally directed toward the merger conveyor as the header moves, such as when the header is tilted to vary cutting height or when it is raised or lowered at the end or beginning of a cutting swath.

It would be desirable to provide an apparatus to adjust the swathgate in conjunction with header movement to optimize the crop trajectory for interaction with a merger apparatus and minimize crop loss that would overcome the above problems and limitations.

SUMMARY OF THE INVENTION

Accordingly, it is an object of the present invention to provide a mechanism for adjusting the angular position of a swathgate responsive to movement of a header so that an optimal trajectory of crop discharged from the header can be maintained for a range of header operating positions.

It is a further object of the present invention to provide a mechanism for adjusting the angular position of a swathgate so that an airborne crop stream discharged from conditioner rolls is optimally directed.

It is a further object of the present invention to provide a mechanism for adjusting the angular position of a swathgate that is responsive to changes in the vertical position of the harvester header.

It is a further object of the present invention to provide a floating swathgate that will vary crop trajectory as the header follows the ground contours.

It is a still further object of the present invention to provide a floating swathgate that will vary crop trajectory as the header is tilted to vary cutting height.

It is a still further object of the present invention to provide a floating swathgate mechanism that is durable in construction, inexpensive of manufacture, carefree of maintenance, easily assembled, and simple and effective to use.

These and other objects are achieved according to the instant invention by providing a floating swathgate for a cutting and conditioning header for a frame-supported tractor in which the angular attitude of the swathgate relative to an airborne stream of crop material being ejected from conditioner apparatus is varied as the header moves vertically with respect to the tractor to optimally direct the crop material toward a rearwardly disposed crop merger conveyor. As the header moves vertically, changes in the angular attitude of the swathgate direct the airborne crop material to generally the same location on the merger conveyor to minimize crop losses that typically occur with a fixed swathgate when the crop trajectory varies directly with the header vertical movement.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 is an expanded partial elevation view of the floating swathgate shown in FIG. 1 wherein the swathgate is angled toward the first position;

FIG. 5 is an expanded partial elevation view of the floating swathgate shown in FIG. 2 wherein the swathgate is angled toward the second position.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
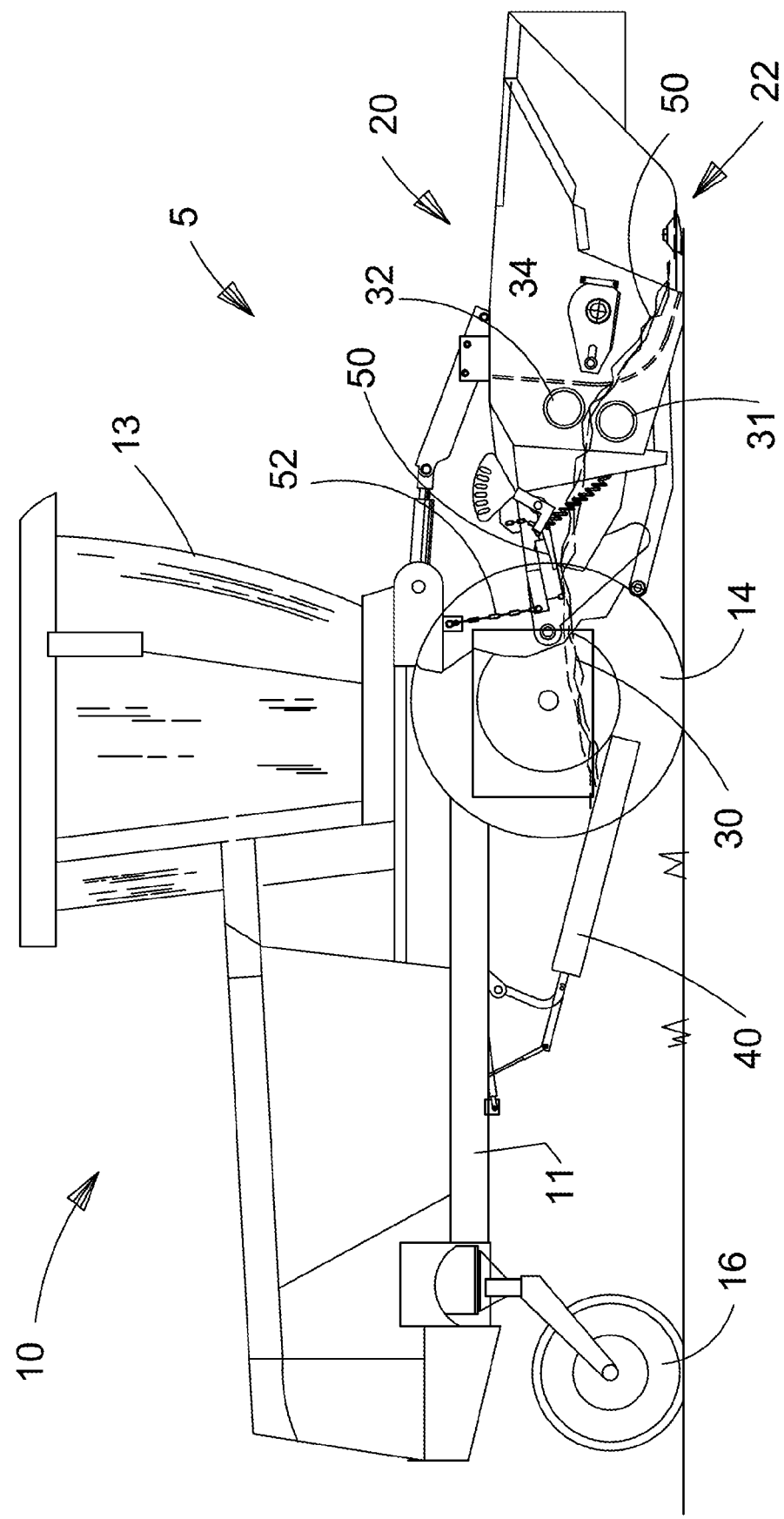
FIG. 1 is a side elevation view of a typical agricultural windrower having a forwardly positioning cutting and conditioning header and a rearwardly positioned merger apparatus of the type on which the present invention is useful.

FIG. 1 shows a side view of a typical self-propelled windrower 5 used for harvesting a standing crop as it travels forwardly across the ground. Usually, a tractor 10 pushes a header 20 which severs the crop material from the ground by a sickle-bar, rotary cutter or other functionally equivalent cutting apparatus 22 arranged along the forward edge of the header 20. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting apparatus 22 in the leading edge of the header and falls rearwardly into the header 20 where it is engaged by a pair of transversely elongate conditioning rolls 31, 32. Conditioning rolls 31, 32 are closely spaced apart on parallel axes such that a gap 34 is created therebetween through which severed crop material 30 passes. The severed and conditioned crop material is then ejected rearwardly from the conditioner rolls 31, 32 in an airborne stream generally in the space between the drive wheels 14 whereupon it falls to the ground in a windrow. Shields may be used to influence the trajectory of the airborne crop to control the configuration of the resultant windrow. Such shields may include side shields (not shown) for influencing the width of the resultant windrow and a swathgate 50 for influencing the height of the crop trajectory.

It is common to provide a crop merger apparatus 40 may be positioned rearwardly from the conditioner rolls 31, 32 to receive crop discharged from the rolls and convey it laterally on a moving conveyor for deposit on the ground. Crop mergers allow crop material from multiple swaths to be combined into a single windrow for improved efficiency in subsequent harvesting operations. For optimal efficiency, the trajectory of the crop material 30 must be directed so that crop lands on the moving conveyor. Crop not directed to fall on the conveyor will fall to the ground and may not be gathered with the nearby windrow. A swathgate 50 generally may be angularly adjusted to deflect the flow of crop material being discharged from the conditioner rolls 31, 32 for optimal interaction with the merger conveyor. Known swathgates are manually angularly adjusted for the crop behind harvested and the spatial relationship between the conditioner rolls and the merger conveyor for the nominal header operating height on level ground. Once set, the swathgate is not moved while the machine is operating.

The general operation and construction of windrowers of the type on which the present invention may find utility can be found in U.S. Pat. Nos. 5,327,709, issued on Jul. 12, 1994, to Webb, 6,073,431, issued on Jun. 13, 2000, to Osborne et al., and 6,662,539, issued on Dec. 16, 2003 to Adams et al., the descriptive portions of which are incorporated herein by reference.

Headers are generally allowed to move vertically relative to the tractor chassis 11 so that the header can float over uneven terrain and sever the crop at approximately the same height above the ground. As the swathgate is typically connected to and moves with the header 20, changes in header height relative to the tractor result in changes in the crop trajectory. Crop trajectory changes are more pronounced at the end of a swath when the header is raised as the windrower turns around. The present invention provides a movable swathgate 50 having an angular position that is varied by a control link 52 as the header 20 moves relative to the tractor 10. Variation of the angular position of swathgate 50 allows the crop trajectory to be varied to maintain a generally constant falling position for the crop. In the preferred embodiment, the target falling position is the conveyor belt of merger apparatus 40.

Figure 2:
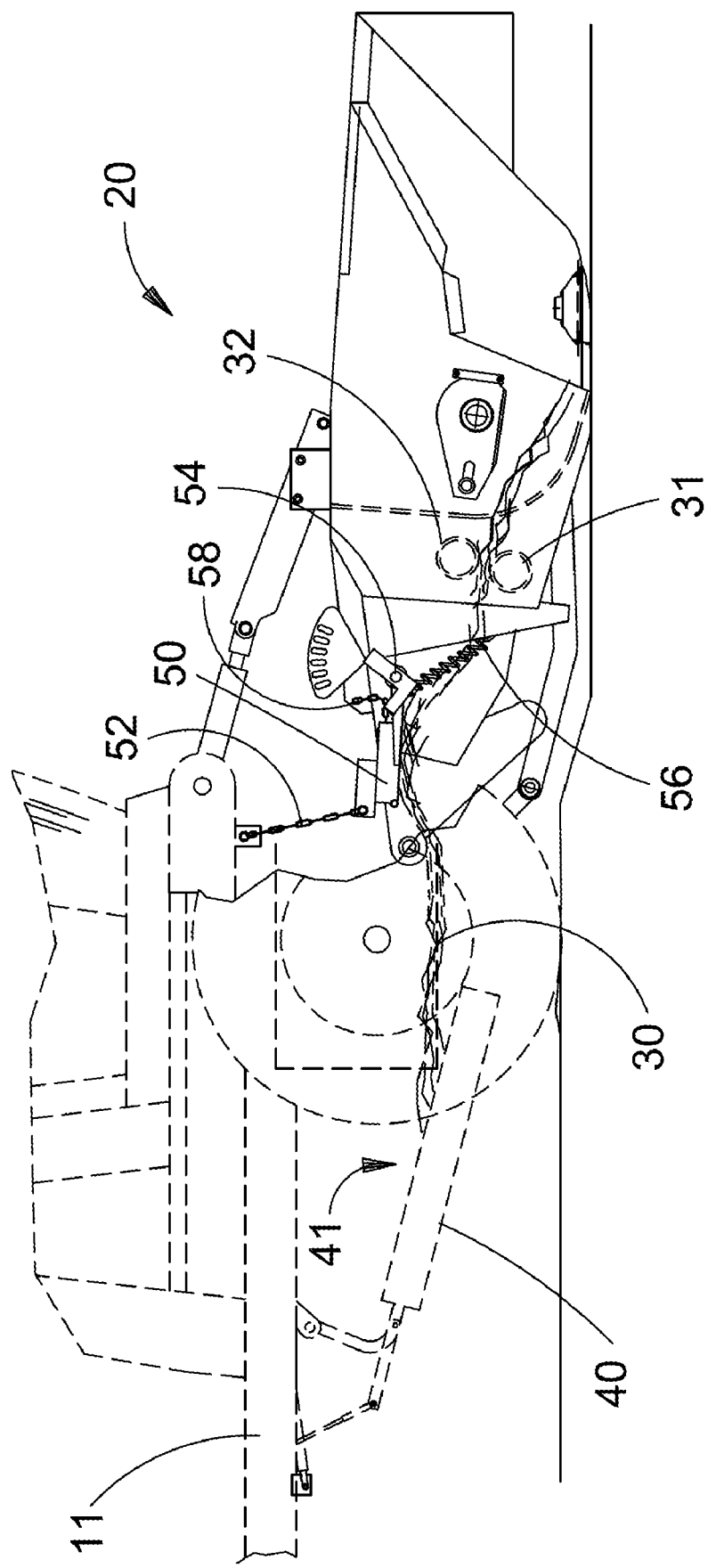
FIG. 2 is a partial elevation view of the windrower tractor wherein the header is downwardly positioned to follow the ground contour showing a first position of the floating swathgate of the present invention.
Figure 3:
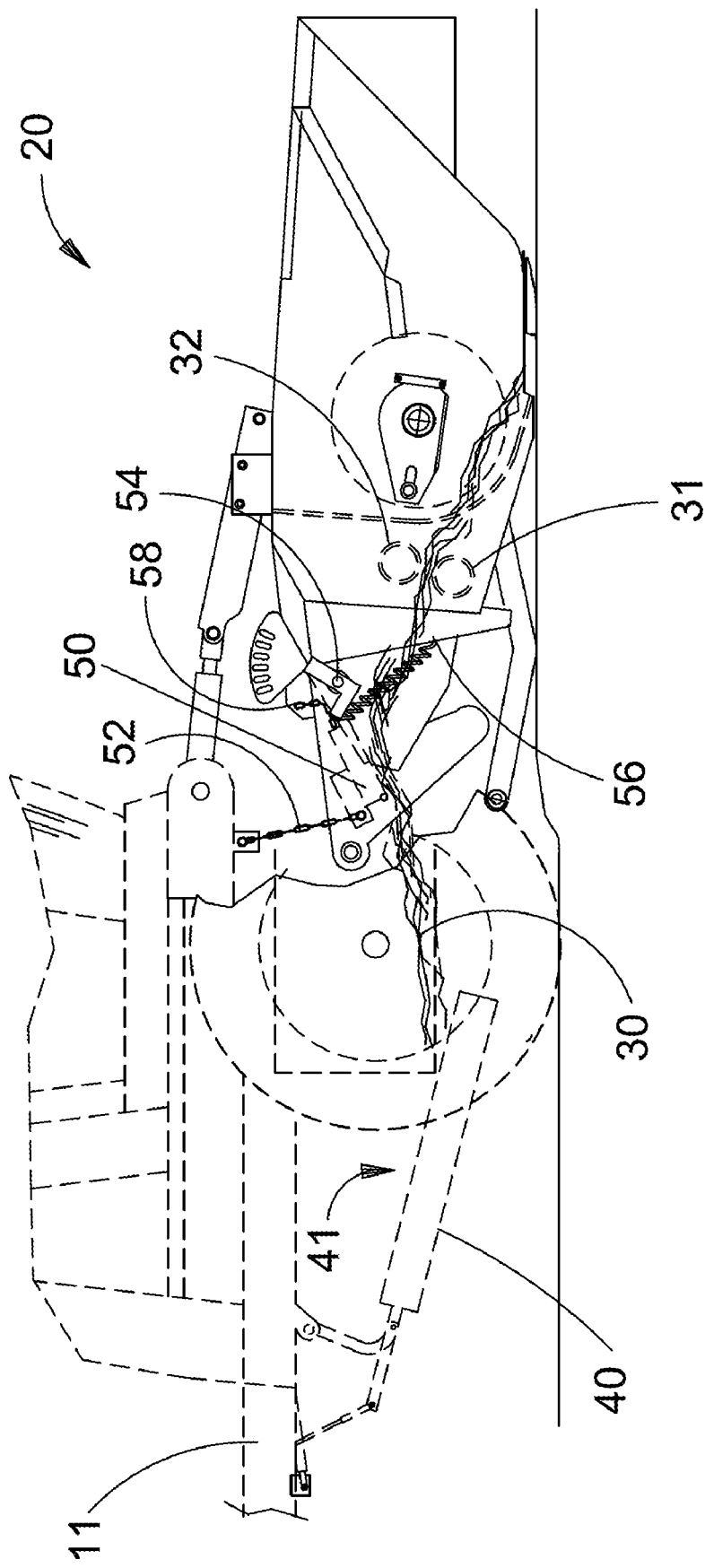
FIG. 3 is a partial elevation view of the windrower tractor wherein the header is upwardly positioned to follow the ground contour showing a second position of the floating swathgate of the present invention.
Figure 6:
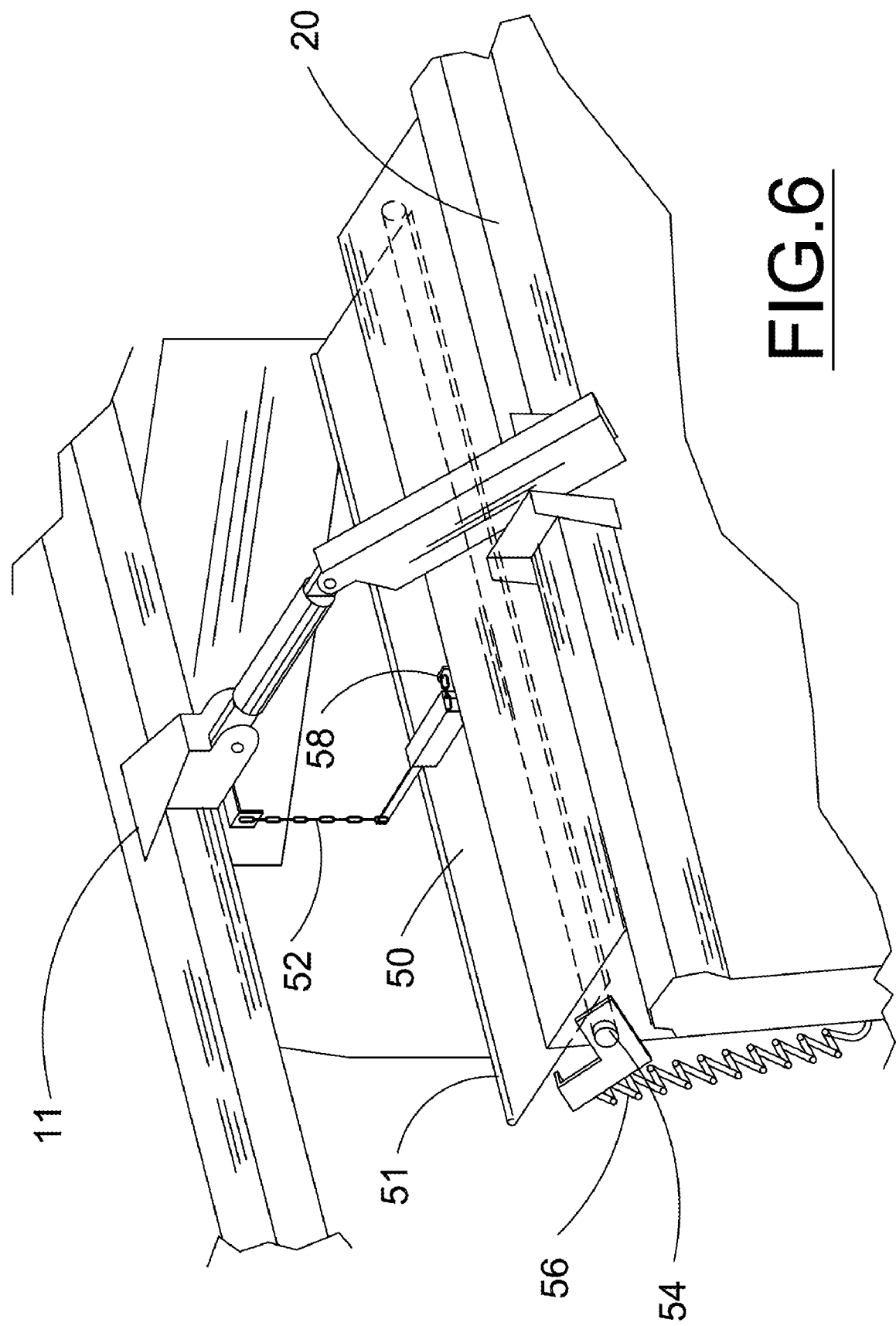
FIG. 6 is an partial isometric view of the forward end of the header showing one embodiment of the mechanism for controlling angular attitude of the floating swathgate.

Referring now to FIGS. 2 and 4, wherein header 20 is shown in a lower than nominal position such as would occur when the header follows a depression in the terrain. Similarly, FIGS. 3 and 5 show header 20 in a higher than normal position such as would occur when the header follows a bump or raised feature in the terrain.

Swathgate 50 comprises a generally planar crop guide oriented generally above the crop trajectory ejected from conditioner rolls 31, 32. Swathgate 50 includes a pivot axle 54 at one edge that allows it to pivot relative to header 20. Pivot axle 54 is oriented transverse on the header 20 and to the crop stream 30. Control link 52 interconnects swathgate 50 and frame 11. The connection of control link 52 to swathgate 50 is at a point away from pivot axle 54 so that forces exerted by control link 52 will cause the swathgate to pivot about the axle 54. As the header moves downwardly relative to the tractor frame 11 as shown in FIGS. 2 and 4, the control link 52 causes swathgate 52 to pivot so that the trailing edge 51 is raised and the angular attitude of the swathgate relative to the crop trajectory (shown as $\Theta$ in FIGS. 3-4 referenced to a horizontal plane) is reduced to a value $\Theta_1$. By raising the trailing edge 51 of the swathgate, the crop flow impinges less on the swathgate, allowing it a higher trajectory toward the merger conveyor 41. Lesser crop impingement on the swathgate results from a lesser angle between the crop trajectory and the plane of the swathgate. In contrast, if the swathgate 50 did not move, downward movement of the header would also lower the trajectory of the crop material resulting in a portion of the crop flow impacting the leading edge of the merger apparatus 40 and subsequently falling to the ground. As the header moves upwardly relative to the tractor frame 11 as shown in FIGS. 3 and 5, the control link 52 allows swathgate 52 to pivot so that the trailing edge 51 is lowered and the angle $\Theta$ of the swathgate 50 increases to a value $\Theta_2$ where $\Theta_2$ is greater than $\Theta_1$. Lowering of the trailing edge 51 increases the angular attitude of the swathgate relative to the crop trajectory which deflects the crop flow downwardly so that it does not travel over the merger apparatus or impinge on the underside of the tractor frame 11.

Swathgate 50 is also connected to a limit link 58 which limits the amount of increase in swathgate angle $\Theta$ and prevents the swathgate from approaching a generally vertical orientation which would preclude most of the crop material from passing beyond the swathgate. As the header is raised, the trailing edge 51 of swathgate 50 will move downwardly relative to the header. Continued upward header movement will cause limit link 58 to be extended and exert a force on swathgate 50 to prevent further downward movement on the swathgate trailing edge. Because of the relationship of the two links through the swathgate, both control link 52 and limit link 58 are tensile members. When control link 52 is controlling movement of the swathgate 50, limit link 58 is slack (exerting no appreciable positioning force on the swathgate). When limit link 58 is controlling the position of the swathgate, control link 52 is slack. In the preferred embodiment, both control link and limit link 58 comprise a length of chain which provides high strength and reliability with low production costs. One skilled in the art will recognize that a cable, compressible link, or any other tensile only member could easily provide the same function and is thus contemplated by this disclosure.

Swathgate 50 is biased toward downward movement of trailing edge 51 by the weight of the swathgate itself. Uneven terrain could result in the swathgate "bouncing" as the windrower traverses the ground. To minimize the effect of a bounding swathgate and the resultant variation in crop trajectory, tension member 56, an extension spring in the preferred embodiment, is included to provide a positive bias on the swathgate 50 in the downward direction. The tension member 56 is suitably sized to allow movement of the swathgate 50 between the extremes of the limiting link 58 engaged (as the header is raised) to the header fully lowered.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A mechanism for controlling the position of a swathgate on a mower-conditioner header of an agricultural harvester, the header being vertically positionable between raised and lowered positions and having a conditioning mechanism for conditioning severed crop material and ejecting it rearwardly along a crop flow path, the mechanism comprising:

a swathgate pivotably connected to the header and having a generally planar working surface movable in generally opposing first and second directions about a pivot axis thereby allowing said planar surface to attain an angular attitude with respect to the crop flow path based on the header vertical position;

a control link connected between a chassis of the harvester and said swathgate at a connection point wherein the connection point does not move relative to the chassis, the control link configured for pivoting said swathgate in said second direction when the header is moved with respect to the chassis toward the lowered position and for allowing said swathgate to pivot in said first direction when the header is moved toward the raised position; and a tension member connected to said swathgate and said header for maintaining a bias force on said swathgate in said first direction.

2. The mechanism of claim 1, wherein swathgate movement in said first direction decreases said angular attitude and swathgate movement in said second direction increases said angular attitude; and the control link is configured to permit movement of the swathgate in the first direction in response to upward movement of the header with respect to the chassis and to move the swathgate in the second direction in response to a downward movement of the header.

3. The mechanism of claim 2, wherein said swathgate is configured for directing crop flow towards a crop expulsion target, and the control link is configured to adjust the swathgate in response to movement of the header with respect to the chassis such that position of the crop expulsion target remains generally constant with respect to the chassis.

4. The mechanism of claim 3, wherein said control link is a chain.

5. The mechanism of claim 1, wherein said tension member is a spring.

6. The mechanism of claim 1, further comprising a limit link connected to said swathgate and said header for limiting the extent of movement of said swathgate in said first direction.

7. In a harvesting machine including a frame, a forwardly disposed, transversely elongated crop cutting header, the header being supported by the frame in a manner allowing vertical movement of the header relative to the frame between raised and lowered positions to enable the header to float at a generally constant height above the ground as the machine moves across the ground, a crop cutting apparatus disposed on a forward edge of the header, a pair of transversely elongate, parallel counter-rotating conditioning rolls positioned rearwardly from the cutting apparatus, the rolls being closely spaced for receiving cut crop material therebetween and propelling the crop material in a rearwardly directed airborne stream along a trajectory, a merging apparatus disposed rearwardly of the conditioning rolls for receiving the airborne stream and transporting the stream laterally for deposit on the ground, the improvement in a crop deflecting swathgate comprising:

the swathgate pivotably connected to the header and having a generally planar working surface movable in generally opposing first and second directions about a pivot axis thereby allowing said planar surface to attain an angular attitude with respect to the crop trajectory as the vertical position of the header changes;

a control link connected between the frame and said swathgate wherein the control link is connected to the frame at a connection point wherein the connection point does not move relative to the frame, the control link configured for pivoting said swathgate in said second direction when the header is moved toward the lowered position and for allowing said swathgate to pivot in said first direction when the header is moved toward the raised position; and a tension member connected to said swathgate and said header for maintaining a bias force on said swathgate in said first direction.

8. The improvement of claim 7, wherein swathgate movement in said first direction decreases said angular attitude and swathgate movement in said second direction increases said angular attitude; and the control link is configured to permit movement of the swathgate in the first direction in response to upward movement of the header with respect to the chassis towards the raised position and to move the swathgate in the second direction in response to a downward movement of the header towards the lowered position.

9. The improvement of claim 7, wherein said swathgate is configured for directing crop flow towards a crop placement target, and the control link is a tension link configured to adjust the swathgate in response to movement of the header with respect to the chassis such that position of the crop expulsion target remains generally constant with respect to the chassis.

10. The improvement of claim 9, wherein said tension link is a chain.

11. The improvement of claim 7, wherein said tension member is a spring.

12. The improvement of claim 7, further comprising a limit link connected to said swathgate and said header for limiting the extent of movement of said swathgate in said first direction.

13. A mechanism for controlling the position of a swathgate on a mower-conditioner header of an agricultural harvester, the header being vertically positionable between raised and lowered positions and having a conditioning mechanism for conditioning severed crop material and ejecting it rearwardly along a crop flow trajectory, the mechanism comprising:
- a swathgate pivotably connected to the header and having a generally planar working surface movable between opposing first and second positions about a pivot axis thereby allowing the angular attitude of said planar surface with respect to the crop flow trajectory to be adjusted in conjunction with vertical movement of the header;
- a control link connected between a chassis of the harvester and said swathgate wherein the control link is connected to the chassis at a connection point that does not move relative to the chassis, the control link configured for pivoting said swathgate toward said second position when the header is moved toward the lowered position and for allowing said swathgate to pivot toward said first position when the header is moved toward the raised position;
- a tension member connected to said swathgate and said header for maintaining a bias force on said swathgate in said first direction; and
- a limit link connected to said swathgate and said header for limiting the extent of movement of said swathgate in said first direction.

14. The mechanism of claim 13, wherein swathgate movement toward said first position decreases said angular attitude and swathgate movement toward said second position increases said angular attitude.

15. The mechanism of claim 14, wherein said control link is a tension member.

16. The mechanism of claim 15, wherein said tension member is a chain.

17. The mechanism of claim 16, wherein the limit link and the control link are configured to alternatively control the swathgate position whereby when the control link applies a force to the swathgate the limit link is not tensioned and when the limit link applies a force to the swath gate the control link is not tensioned.

* * * * *